(12) United States Patent
Cariou et al.

(10) Patent No.: US 10,225,870 B2
(45) Date of Patent: Mar. 5, 2019

(54) DEVICE SETUP STATES FOR LINK AGGREGATION IN WIRELESS COMMUNICATIONS

(71) Applicants: Laurent Cariou, Portland, OR (US); Bahareh Sadeghi, Portland, OR (US); Carlos Cordeiro, Portland, OR (US); Yaron Alpert, Petah Tikva (IL); Robert Stacey, Portland, OR (US)

(72) Inventors: Laurent Cariou, Portland, OR (US); Bahareh Sadeghi, Portland, OR (US); Carlos Cordeiro, Portland, OR (US); Yaron Alpert, Petah Tikva (IL); Robert Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 16 days.

(21) Appl. No.: 15/392,684

(22) Filed: Dec. 28, 2016

(65) Prior Publication Data
US 2018/0054838 A1  Feb. 22, 2018

Related U.S. Application Data

(60) Provisional application No. 62/377,191, filed on Aug. 19, 2016.

(51) Int. Cl.
*H04W 76/10* (2018.01)
*H04W 76/15* (2018.01)
*H04W 72/04* (2009.01)

(52) U.S. Cl.
CPC ........... *H04W 76/10* (2018.02); *H04W 76/15* (2018.02); *H04W 72/0453* (2013.01)

(58) Field of Classification Search
CPC . H04W 72/0453; H04W 76/02; H04W 76/10; H04W 8/005; H04W 76/025; H04W 76/15
See application file for complete search history.

(56) References Cited

U.S. PATENT DOCUMENTS

| 2012/0120892 | A1* | 5/2012 | Freda | H04W 8/005 370/329 |
| 2013/0266136 | A1* | 10/2013 | Chu | H04K 1/003 380/34 |
| 2015/0289299 | A1* | 10/2015 | Abraham | H04L 12/4633 370/328 |
| 2018/0054724 | A1* | 2/2018 | Cariou | H04W 8/005 |
| 2018/0054838 | A1* | 2/2018 | Cariou | H04W 76/10 |
| 2018/0054847 | A1* | 2/2018 | Cariou | H04W 76/15 |

\* cited by examiner

*Primary Examiner* — Benjamin H Elliott, IV
(74) *Attorney, Agent, or Firm* — Eversheds Sutherland (US) LLP

(57) ABSTRACT

This disclosure describes systems, methods, and devices related to link aggregation between devices. A device may determine a first frequency band and a second frequency band for sending data to a second device in a multiband link aggregation session. The device may cause to send, in an initial state, a setup request frame to the second device for establishing the multiband link aggregation session. The device may receive, in a setup completion state, a setup response frame from the second device to establish the multiband link aggregation session. The device may cause to send, in an operating mode established state, the data to the second device over the first frequency band and/or the second frequency band in the multiband link aggregation session.

20 Claims, 7 Drawing Sheets

DEVICE SETUP STATES FOR LINK AGGREGATION IN WIRELESS COMMUNICATIONS

CROSS-REFERENCE TO RELATED APPLICATIONS

This application claims the benefit of U.S. Provisional Application Ser. No. 62/377,191, filed Aug. 19, 2016, the disclosure of which is incorporated herein by reference as if set forth in full.

TECHNICAL FIELD

This disclosure generally relates to systems, methods, and devices for wireless communications and, more particularly, enhancing the performance of wireless devices using link aggregation between these wireless devices.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth.

BRIEF DESCRIPTION OF THE DRAWINGS

The present disclosure is illustrated by way of example and not limitation in the figures of the accompanying drawings, in which like references indicate similar elements and in which.

DESCRIPTION

Figure 1:
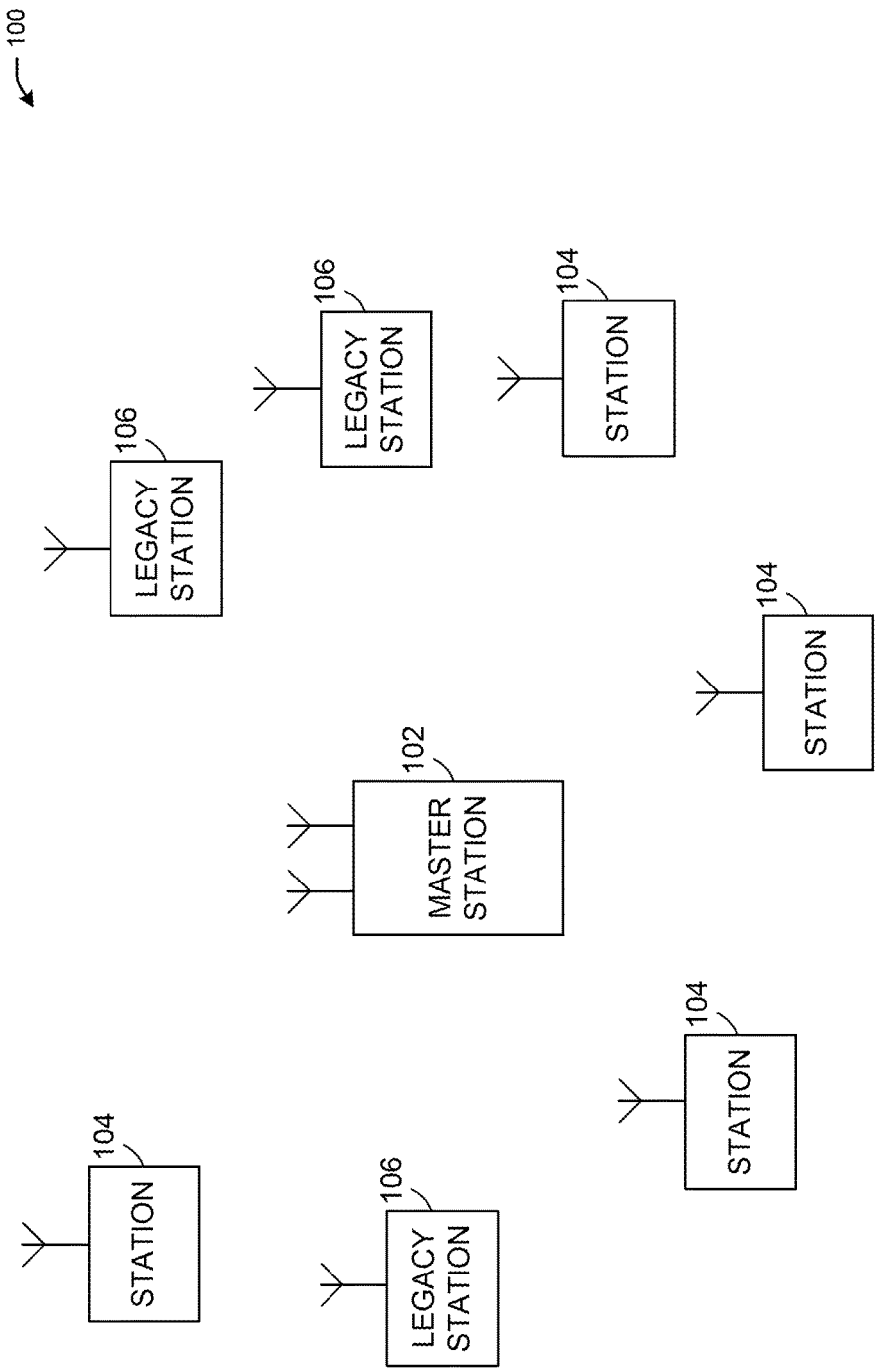
FIG. 1 illustrates a WLAN, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Example embodiments described herein provide certain systems, methods, and devices, for enhancing the performance of wireless devices using link aggregation between multiple access points in various wireless networks, including, but not limited to, IEEE 802.11ax, IEEE 802.11ay, or wireless based on 5G 3GPP technologies.

In the past two decades, the IEEE 802.11 WLAN networks have experienced tremendous growth with the proliferation of Wi-Fi devices, as a major Internet access scheme for mobile computing and electronic devices. Since the early deployment of IEEE 802.11 devices in both enterprise and public networks, there have only been proprietary solutions to provide coordination among access points (APs). However, such coordination is transparent to client devices, meaning that a client device, also called a station (STA), establishes a physical layer connection with only one AP at a time. That is, the STA is able to communicate with only one AP at a time for a particular communication session.

In one embodiment, different states may be defined for a multiband link aggregation (MB-LA) setup protocol.

In one embodiment, an MB-LA setup protocol may provide link aggregation of data planes between different wireless air interfaces on different frequency bands (800 MHz, 2.4 GHz, 5 GHz, 60 GHz, and others) by transitioning between one or more states in order to provide a multi-band link aggregation and allow one device to communicate simultaneously with more than one AP. The APs may be connected to a controller device that manages the packet exchanges between the APs.

In one embodiment, the MB-LA setup protocol may define an initial state (e.g., State 1) when MB-LA is not established, a setup completion state (e.g., State 2) when MB-LA has been set up, an operating mode established state (e.g., State 3) when the MB-LA is implemented on a data plane, and an operating mode confirmed state (e.g., State 4) when the MB-LA is both implemented on the data plane and a successful data frame exchange between wireless devices has been confirmed.

In some embodiments, the MB-LA setup protocol may enable switching between the different states (e.g., States 1-4) including setup frame requests and setup frame responses used for establishing MB-LA between devices.

Embodiments described herein may improve multiband operation by enabling the establishment of a link aggregation session between wireless devices.

For example, embodiments may provide one or more improvements. These improvements may include improvements in the latency to establish link aggregation, reduction in the overhead of scanning frames and pre-association frames, and improvements in the quality of link aggregation, for example, by triggering link aggregation setup only when selective conditions are met. Other improvements may include (1) throughput optimizations by reducing overhead, such that data may be aggregated and sent in a more efficient way; (2) latency optimizations by reducing the system delays, such that a packet may be sent in the next TXOP regardless of the band; (3) reduce system load, by reducing the collision ratio since less PPDU is sent over the air; (4) improve context switching between bands; (5) power optimization due to less power for transmission of data; and (6) making multi-band operation transparent to the upper layer.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 illustrates a WLAN 100 in accordance with some embodiments. The WLAN may comprise a basis service set (BSS) or personal BSS (PBSS) that may include a master station 102, which may be an AP or PBSS control point (PCP), a plurality of wireless STAs 104 and a plurality of legacy (e.g., IEEE 802.11n/ac/ad/ah) stations 106. It should be understood that the terms master stating 102 and AP 102 are used interchangeably in this disclosure for ease of use.

The master station 102 may be an AP using the IEEE 802.11 to transmit and receive packets. The master station 102 may be a base station. The master station 102 may be a PBSS. The master station 102 may use other communications protocols as well as the IEEE 802.11 protocol. The IEEE 802.11 protocol may be IEEE 802.11ay. The IEEE 802.11 protocol may include using orthogonal frequency division multiple-access (OFDMA), time division multiple access (TDMA), and/or code division multiple access (CDMA). The IEEE 802.11 protocol may include a multiple-access technique. For example, the IEEE 802.11 protocol may include space-division multiple access (SDMA), multiple-input multiple-output (MIMO), multi-user MIMO (MU-MIMO), and/or single-input single-output (SISO). The master station 102 and/or wireless STA 104 may be configured to operate in accordance with NG60, WiGiG, and/or IEEE 802.11ay.

The legacy stations 106 may operate in accordance with one or more of IEEE 802.11 a/b/g/n/ac/ad/af/ah/aj, or another legacy wireless communication standard. The legacy stations 106 may be STAs or IEEE STAs. The wireless STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ay or another wireless protocol. In some embodiments, the wireless STAs 104 may operate in accordance with IEEE 802.11ax (e.g., within the 2.4 and 5 GHz bands) or IEEE 802.11ah. The wireless STAs 104 and/or master station 102 may be attached to a BSS.

The master station 102 may communicate with legacy stations 106 in accordance with legacy IEEE 802.11 communication techniques. In example embodiments, the master station 102 may also be configured to communicate with wireless STAs 104 in accordance with legacy IEEE 802.11 communication techniques. The master station 102 may use techniques of IEEE 802.11ad for communication with legacy device. The master station 102 may be a personal basic service set (PBSS) Control Point (PCP), which can be equipped with large aperture antenna array or Modular Antenna Array (MAA).

The master station 102 may be equipped with more than one antenna or more than one Wi-Fi communication interface. Each of the antennas of master station 102 may be a phased array antenna with many elements. In some embodiments, an IEEE 802.11ay frame may be configurable to have the same bandwidth as a channel. The frame may be configured to operate over 1-4 2160 MHz channels. The channels may be contiguous in one embodiment. In one embodiment, the master station 102 may be configured to operate over a number of frequency bands (e.g., 1 to 4 bands) or, alternatively, may have two or more communication interfaces configured to operate at the same frequency band in non-overlapping channels.

An IEEE 802.11ay frame may be configured for transmitting a number of spatial streams, which may be in accordance with MU-MIMO. In other embodiments, the master station 102, wireless STA 104, and/or legacy station 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to IEEE 802.11ay communications. In accordance with some IEEE 802.11ay embodiments, a master station 102 may operate as a master station which may be arranged to contend for a wireless medium (e.g., during a contention period) to receive exclusive control of the medium for performing enhanced beamforming training for a multiple access technique such as OFDMA and/or MU-MIMO. In some embodiments, the multiple-access technique used during the TxOP (transmit opportunity) may be a scheduled OFDMA and/or MU-MIMO technique, although this is not a requirement. In some embodiments, the multiple access technique may be a space-division multiple access (SDMA) technique.

The master station 102 may also communicate with legacy stations 106 and/or wireless STAs 104 in accordance with legacy IEEE 802.11 communication techniques.

The wireless stations 104, master station 102, and/or legacy stations 106 may be any addressable unit. It should be noted that any addressable unit might be a station (STA). An STA may take on multiple distinct characteristics, each of which shape its function. For example, a single addressable unit might simultaneously be a portable STA, a quality-of-service (QoS) STA, a dependent STA, and a hidden STA. The wireless stations 104, master station 102, and/or legacy stations 106 may be STAs. The wireless stations 104, master station 102, and/or legacy stations 106 may operate as a personal basic service set (PBSS) control point/access point (PCP/AP). The wireless stations 104, master station 102, and/or legacy stations 106 may include any suitable processor-driven device including, but not limited to, a mobile device or a non-mobile, e.g., a static, device. For example, the wireless stations 104, master station 102, and/or legacy stations 106 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Any of the HE stations 104, master station 102, and/or legacy stations 106 may be configured to communicate with each other via one or more communications networks 130 wirelessly or wired. The wireless stations 104 and/or legacy stations 106 may also communicate peer-to-peer or directly with each other with or without the master station 102. Any of the communications networks 130 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the wireless stations 104, master station 102, and/or legacy stations 106 may include one or more communications antennas or Wi-Fi communication interfaces). The one or more communications antennas may be any suitable type of antennas corresponding to the communications protocols used by the wireless stations 104, master station 102, and/or legacy stations 106. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the wireless stations 104, master station 102, and/or legacy stations 106.

MIMO beamforming in a wireless network may be accomplished using RF beamforming and/or digital beamforming. In some embodiments, in performing a given MIMO transmission, the wireless stations 104, master station 102, and/or legacy stations 106 may be configured to use all or a subset of its one or more communications antennas to perform MIMO beamforming.

Any of the wireless stations 104, master station 102, and/or legacy stations 106 may include any suitable radio and/or transceiver for transmitting and/or receiving radio frequency (RF) signals in the bandwidth and/or channels corresponding to the communications protocols utilized by any of the wireless stations 104, master station 102, and/or legacy stations 106 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via channels under 1 GHz (e.g., 802.11ah), 2.4 GHz channels (e.g., 802.11b, 802.11g, 802.11n, 802.11ax), 5 GHz channels (e.g., 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In example embodiments, the wireless STA 104 and/or the master station 102 are configured to perform the methods and operations herein described in conjunction with FIGS. 1, 2, 3, 4A and 4B.

Embodiments described herein provide improvements regarding next generation Wi-Fi or for 802.11ax that can involve the definition of a link aggregation setup protocol for establishing data planes between different Wi-Fi air interfaces on different frequency bands (e.g., 800 MHz, 2.4 GHz, 5 GHz, 60 GHz, and others) in accordance with embodiments described herein. Link aggregation can also be an improvement to embodiments involving multiple air interfaces in the same band (for example, two independent IEEE 802.11ac/ax air interfaces at 5 GHz on two different 80 MHz channels). It is understood that the above descriptions are for purposes of illustration and are not meant to be limiting.

Figure 2:
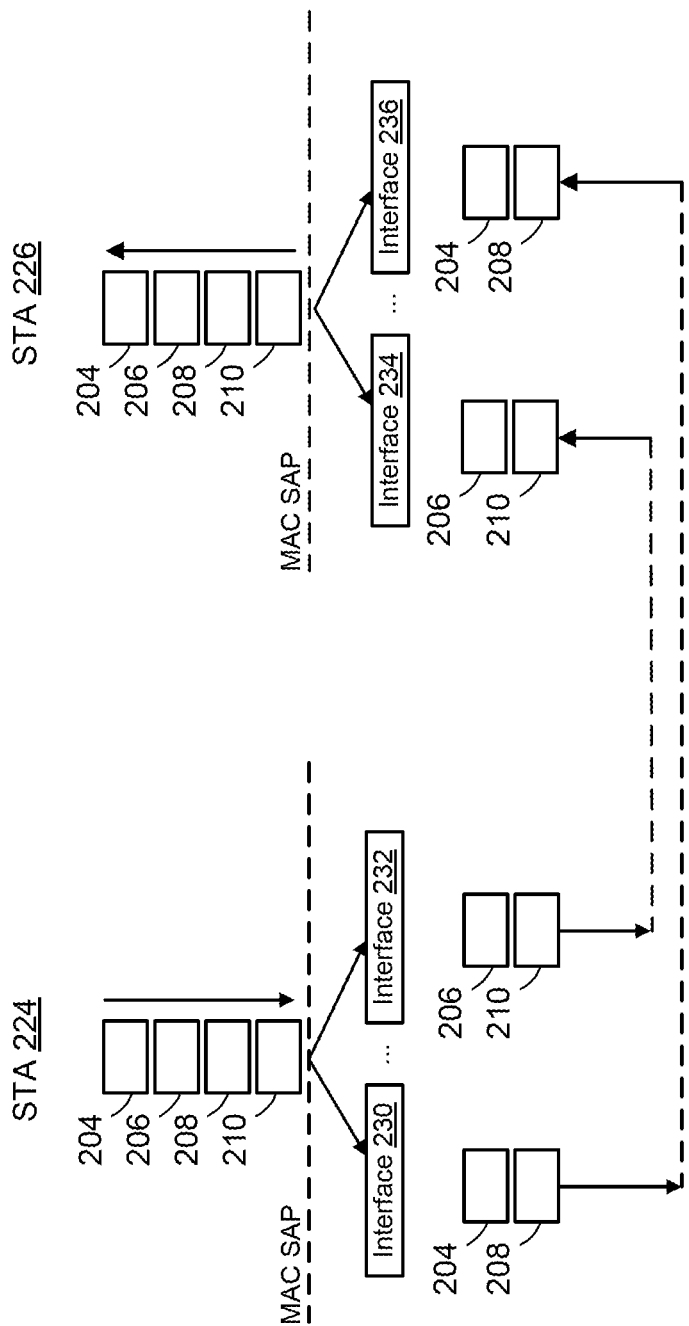
FIG. 2 illustrates load balancing on two air interfaces, in accordance with one or more example embodiments of the present disclosure.

FIG. 2 depicts an illustrative schematic diagram of a link aggregation system, in accordance with one or more example embodiments of the present disclosure.

Referring to FIG. 2, there is shown two devices (e.g., STA 224 and STA 226). The STA 224 may be a device that is transmitting data to the STA 226. In this example, the STA 224 may process packets 204, 206, 208, and 210, that may be arriving from higher layers (e.g., above the MAC layer) that are destined to the STA 226.

In one embodiment, a link aggregation system may facilitate load-balancing by splitting of data packets received into one or more streams of data packets. The one or more streams may be associated with one or more interfaces, such that each interface is associated with a specific frequency band. For example, one interface may be associated with a 5 GHz frequency band, and another interface may be associated with a 60 GHz frequency band, or both interfaces may be associated with the same frequency band. It should be understood that although a 5 GHz frequency band and a 60 GHz frequency band is listed above, any other type of interface may be employed.

In one embodiment, and referring to the example of FIG. 2, a load-balancing of the one or more streams may be implemented by the link aggregation system such that packets are evenly distributed between the one or more interfaces or may be one interface is favored over another interface based on traffic and network conditions. It may be also possible to customize the load-balancing of the one or more streams based on preferences associated with a particular standard, a system administrator, a network administrator, a user preference, or any other customization.

The STA 224 may split the streams of packets 204, 206, 208, and 210 between two interfaces, interface 230 and interface 232 into two streams. For example, interface 230 may send packets 204 and 208 to STA 226 and interface 232 may send packets 206 and 210 to STA 226. Similarly, on the STA 226, there may be two interfaces, interface 234, and interface 236 that may receive the two streams coming from STA 224. For example, interface 234 may receive packets 206 and 210 and interface 236 may receive packets 204 and 208. The packets 204, 206, 208, and 210 may be merged from the different interfaces and reordered. The packets may then be delivered in the original order to the higher layers.

It should be noted that, the lower MAC and PHY on each of the links can in some embodiments operate independently of each other. Balancing the flow only on one of the two or more links is an example embodiment of such a use case.

In one embodiment, the STA 224 and/or the STA 225 may be an AP. In one embodiment, a link aggregation system may facilitate communications between a user device and multiple APs. For example, a user device may be able to communicate with multiple APs in one communication session. That is, when the user device may act as a source STA such that it is transmitting frames to another device, the user device may be configured to split its outgoing packets across multiple interfaces, where each interface is associated with a particular frequency band. For example, in a two interface scenario, where one interface is associated with a 5 GHz frequency band and other interface is associated with a 60 GHz frequency band, the user device may be configured to split its packets arriving from a higher layer across the two interfaces before transmitting frames over the air to two devices (e.g., two APs) on their respective interfaces. Further, the user device may be able to receive multiple streams from multiple devices and may be configured to aggregate the frames received on the respective interfaces. For example, the user device may receive two streams from two APs. The user device may merge the packets from different interfaces and reorder them before delivering them in the original order to the higher layers. It is understood that the above descriptions are for purposes of illustration and are not meant to be limiting.

Figure 3:
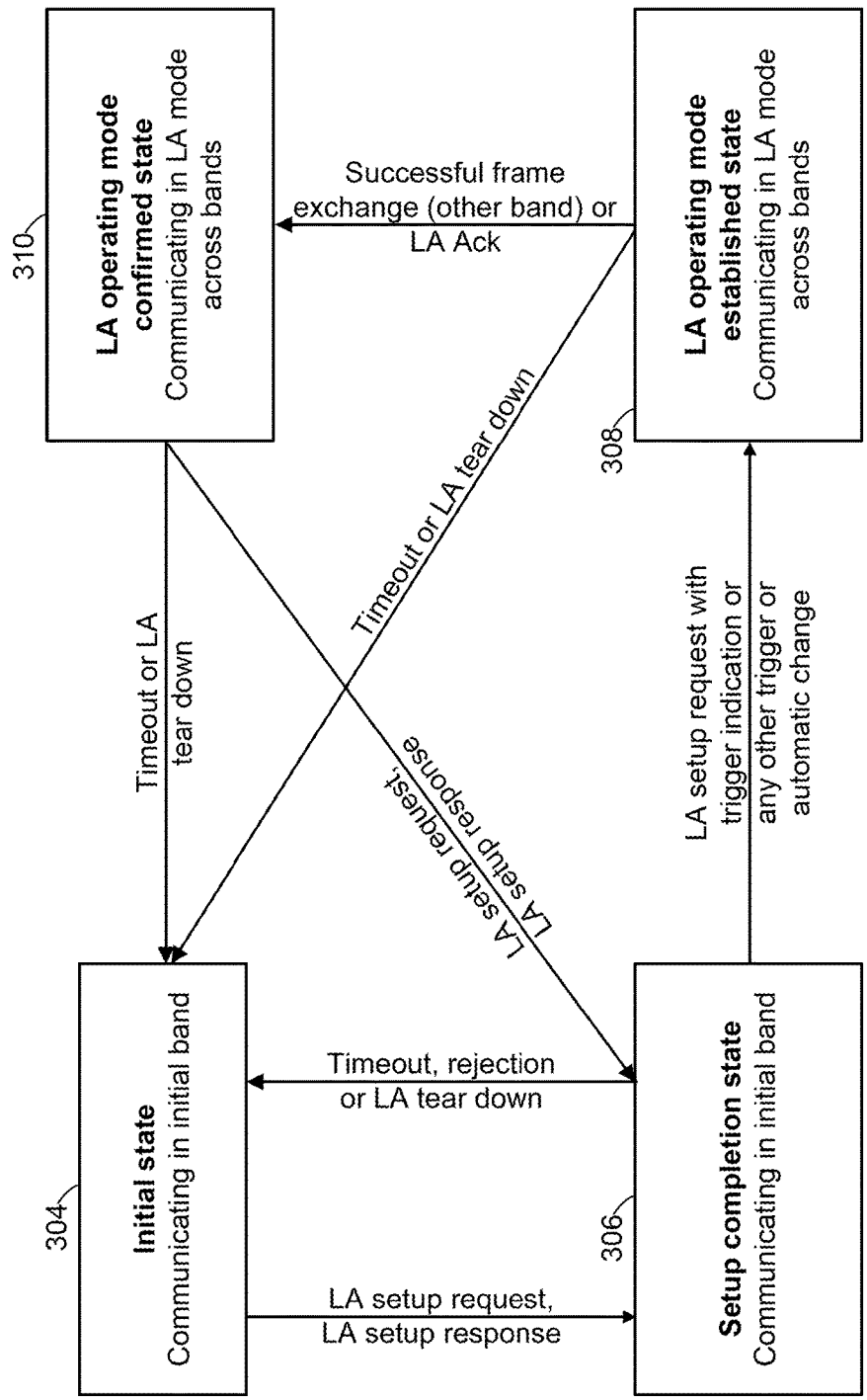
FIG. 3 illustrates various states for a link aggregation system, in accordance with one or more example embodiments of the present disclosure.

FIG. 3 depicts an illustrative schematic diagram of a link aggregation system, in accordance with one or more example embodiments of the present disclosure.

Referring to FIG. 3, there is shown a number of states that may be facilitated by a link aggregation system in order to enhance the performance of wireless devices using link aggregation between multiple devices.

In one embodiment, a link aggregation system may define four states: 1) a first state (e.g., state 304), which is the initial state. State 304 may be applicable when link aggregation (LA) is not established yet; 2) a second state (e.g., state 306), which is the setup completion state, where LA has been set up; 3) a third state (e.g., state 308), which is the LA operating mode established state, where the LA is implemented on the data plane; 4) a fourth state (e.g., state 310), which is the LA operating mode confirmed state, when the LA is implemented on the data plane, and a successful exchange confirmed that all is working well.

In one embodiment, a link aggregation system may transition from one state to another as follows. For example, in the transition from state 304 to state 306, the link aggregation system may establish an LA session in the initial state and transfer it to the setup completion state, an initiator device (e.g., an STA, and/or an AP, or any addressable device) and responder device (e.g., an STA, an AP, or any addressable device) shall exchange LA setup request and LA setup response frames. There might be multiple LA setup request and LA setup response frame transmissions by the initiator device and the responder device, respectively, until the fast session transfer (FST) between these devices becomes established. For this, the responder device may use the "status code field" in the LA setup frame, which can be set to "success" if it accepts the LA setup request, to "rejected_with_suggested_changes" to propose some other changes or to "request_declined" to reject an LA setup request frame. It should be noted that an LA session may exist in the setup completion state, the LA operating mode established state, and the LA operating mode confirmed state. The transition from state 306 to state 308 transition may be automatic either instantaneously or after a pre-agreed duration of time, or can be triggered by a specific trigger frame (like the LA setup frame with a specific trigger information) or can be triggered by a specific timeout, or by a specific event. The transition from state 308 to state 310 may be done when a successful frame exchange has been done on all the bands that are different from the one used in the initial state. The transition from state 4 to state 306 is when a change must be done in the LA, such as, a change of policy for a stream, a power save on one channel band, and/or a change of band/channel/AP. The transition can be done by a frame exchange of LA setup frame, or any other trigger (possibly shorter feedbacks if the changes are small).

In one embodiment, the link aggregation system may utilize tear down frames to terminate an established LA session that was previously setup using an LA setup request/LA setup response frame exchange. For example, an LA tear down frame may be sent to transition back to the initial state 304 from any other state. Thus, the LA tear down frame may be used to transition from state 306 to state 304, from state 308 to state 304, or from state 310 to state 304. In one embodiment, the LA tear down frame may be sent after an end of traffic timeout or when there are link stability (e.g., quality) issues during an established LA session.

In one embodiment, state 306 may be merged with state 308 into a single state (e.g., if the switch between these two states is always automatic). In one embodiment, state 310 may be merged with state 308 if a successful exchange on another frequency band is not needed to validate a multiband link aggregation session.

Figure 4A:
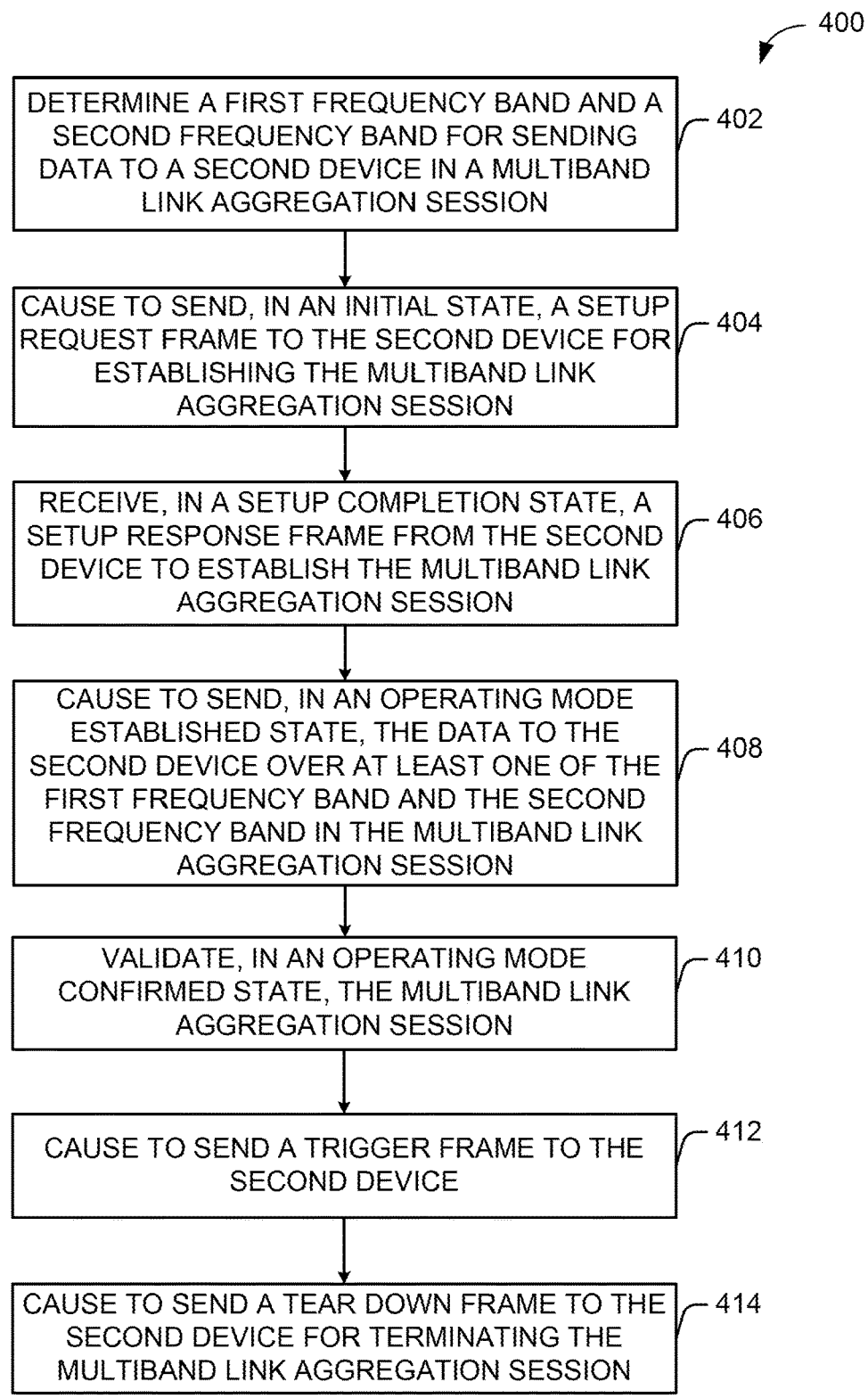
FIG. 4A depicts a flow diagram of an illustrative process for utilizing various states in an illustrative link aggregation system, in accordance with one or more example embodiments of the present disclosure.

FIG. 4A illustrates a flow diagram of illustrative process 400 for utilizing various states in an illustrative link aggregation system, in accordance with one or more example embodiments of the present disclosure.

At block 402, a device (e.g., the AP 102 of FIG. 1) may determine a first frequency band and a second frequency band for sending data to a second device (e.g., the STA 104 of FIG. 1) in a multiband link aggregation session. For example, the AP 102 and the STA 104 may exchange multiband capabilities including communication capabilities in the 5 GHz and 60 GHz frequency bands.

At block 404, the device may cause to send, in an initial state, a setup request frame to the second device for establishing the multiband link aggregation session.

At block 406, the device may receive, in a setup completion state, a setup response frame from the second device to establish the multiband link aggregation session. For example, in transitioning from the initial state to the setup completion state, a link aggregation (LA) session may be established through an exchange of LA setup request and LA setup response frame transmissions by an initiator (e.g., the AP 102) and a responder (e.g., the STA 104). In one embodiment, there may be multiple LA setup request and LA setup response frame transmissions until an FST session between the initiator and the responder becomes established. For example, a responder may use a status code field in its LA setup frame which may be set to SUCCESS if it accepts the LA setup request, to REJECTED_WITH_SUGGESTED_CHANGES to propose changes to the LA setup request, or to REQUEST_DECLINED to reject the LA setup request frame.

At block 408, the device may cause to send, in an operating mode established state, the data to the second device over the first frequency band and/or the second frequency band in the multiband link aggregation session. In one embodiment, the transition from the setup completion state to the operating mode established state may be performed automatically (either instantaneously or after a predetermined duration of time by the device and the second device). In one embodiment, the aforementioned transition may be triggered by a specific trigger frame (e.g., an LA setup frame with specific trigger information), may be triggered by a specific timeout, or by a specific event.

At block 410, the device may validate, in an operating mode confirmed state, the multiband link aggregation session based at least in part on data being received by the second device over a second frequency band. In one embodiment, the operating mode confirmed state may include a transition from the operating mode established state discussed above at block 408 in FIG. 4A. This transition may be accomplished when a successful frame exchange has been done on one or more frequency bands that are different from the one used in the initial state. For example, the transition to the operating mode confirmed state may occur when the AP 102 validates a multiband link aggregation session following data being received by the STA 104 over the 60 MHz frequency band (e.g., the second frequency band) following initial state information being communicated via frame exchange over a 5 MHz frequency band (e.g., a first frequency band).

At block 412, the device may cause to send a trigger frame to the second device. The trigger frame may include information associated with changing one or more characteristics of the multiband link aggregation session. In one embodiment, the trigger frame may be sent to initiate a transition from either the operating mode confirmed state (discussed at block 452) or the operating mode established state (discussed at block 408) to the setup completion state. The trigger frame may be sent to initiate a change in link aggregation. For example, the change may include a change of policy for a stream, a power save on a channel band, or a change of band/channel/AP. As an example, the trigger frame may be sent from the AP 102 in response to poor video quality as a result of data being sent on both 5 GHz and 60 GHz frequency bands. The trigger frame may include information instructing the AP 102 to negotiate using a single frequency band with the STA 104 so that video quality may be improved. In one embodiment, the trigger frame may be an LA setup frame. In other embodiments, a trigger other than a frame may be utilized (e.g., for small changes requiring shorter feedbacks). For example, the trigger may be information carried in a MAC header (e.g., 4 bytes) in an existing data frame thus obviating the need for a new frame (i.e., a new LA setup frame).

At block 414, the device may cause to send a tear down frame to the second device for terminating the multiband link aggregation session. In one embodiment, the device (e.g., the AP 102 or the STA 104) may transmit an LA tear down frame to a corresponding peer device at all of the aforementioned states of the multiband link aggregation session (i.e., the initial state, the setup completion state, the operating mode established state, and the operating mode confirmed state) in order to tear down an established multiband link aggregation session that was previously setup using a setup request/response frame exchange. Upon transmission or reception of the tear down frame, the initiator (e.g., the AP 102) and the responder (e.g., the STA 104) may move to the initial state thus effectively terminating the multiband link aggregation session. In one embodiment, the device may send a tear down frame after an end of traffic timeout or when there are link stability (e.g., quality) issues during a multiband link aggregation session.

In one embodiment, the setup completion state (i.e., State 2) and the operating mode established state (i.e., State 3) may be merged into a single state (e.g., if the switch between these two states is always automatic). In one embodiment, the operating mode confirmed state (i.e., State 4) may be merged with the operating mode established state (i.e., State 3) if a successful exchange on another frequency band is not needed to validate a multiband link aggregation session. It is understood that the above descriptions are for purposes of illustration and are not meant to be limiting.

Figure 4B:
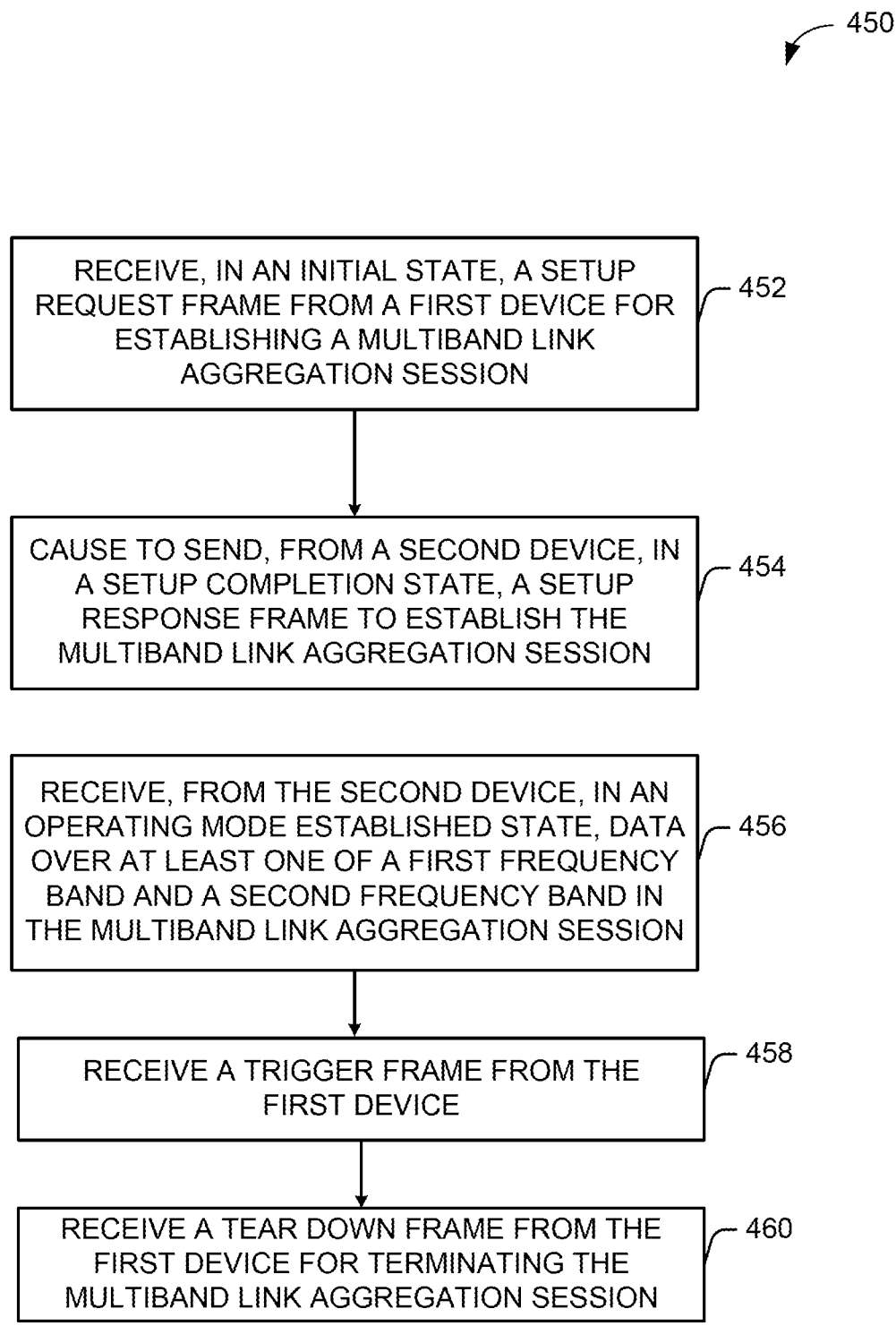
FIG. 4B depicts a flow diagram of an illustrative process for utilizing various states in an illustrative link aggregation system, in accordance with one or more example embodiments of the present disclosure.

FIG. 4B illustrates a flow diagram of illustrative process 450 for utilizing various states in an illustrative link aggregation system, in accordance with one or more example embodiments of the present disclosure.

At block 452, a device (e.g., the STA 104 of FIG. 1) may receive, in an initial state, a setup request frame from a first device (e.g., the AP 102 of FIG. 1) for establishing a multiband link aggregation session.

At block 454, the device may cause to send, in a setup completion state, a setup response frame to establish the multiband link aggregation session.

At block 456, the device may receive, in an operating mode established state, data over a first frequency band and/or a second frequency band in the multiband link aggregation session. As discussed above at block 402, the first frequency band and the second frequency band may be determined by the first device (e.g., the AP 102).

At block 458, the device may receive a trigger frame from the first device. As discussed above at block 412, the trigger frame may include information associated with changing one or more characteristics of the multiband link aggregation session.

At block 460, the device may receive a tear down frame from the first device for terminating the multiband link aggregation session as discussed at block 414, above. It is understood that the above descriptions are for purposes of illustration and are not meant to be limiting.

Figure 5:
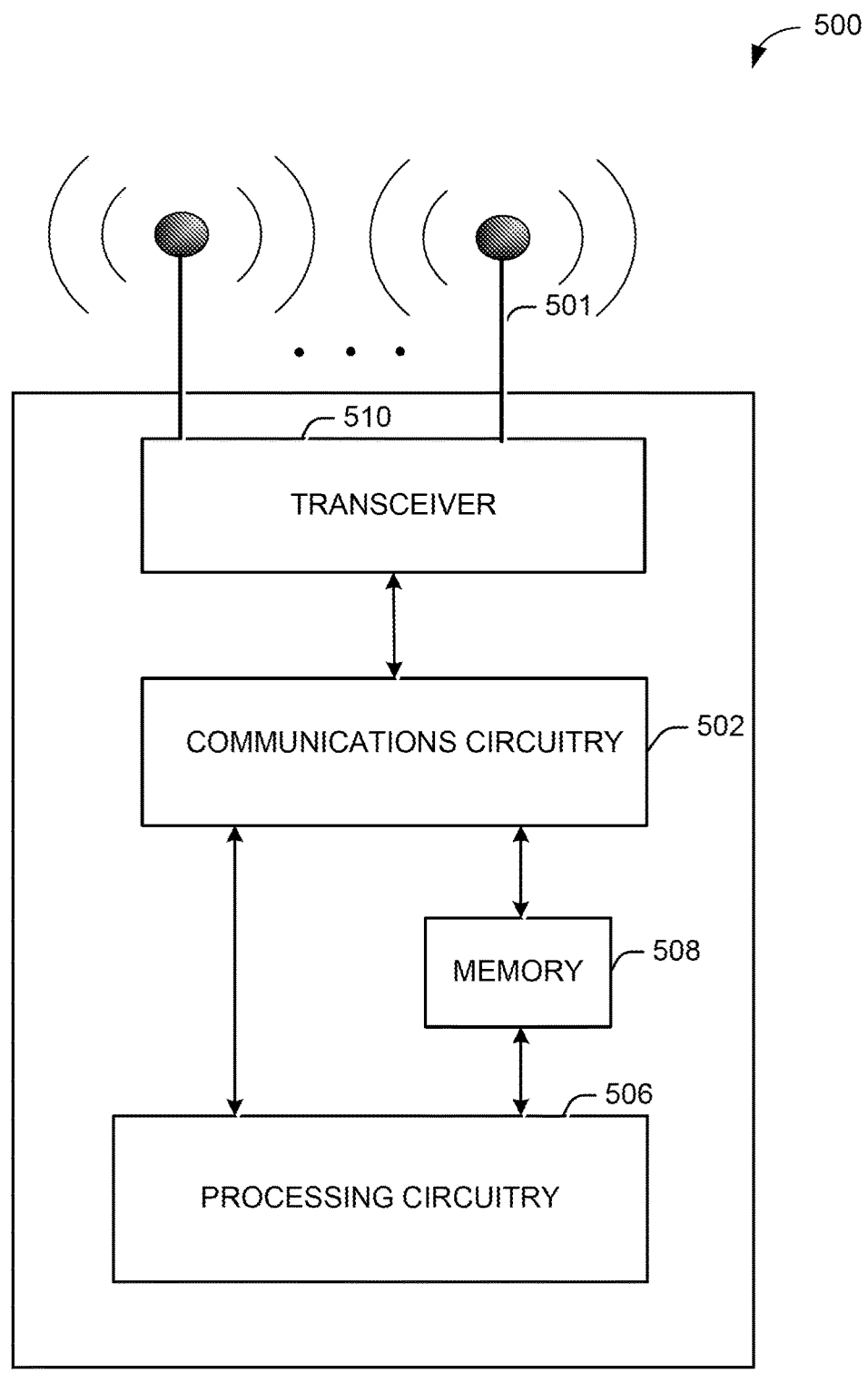
FIG. 5 illustrates a functional diagram of an example communication station that may be suitable for use as a user device, in accordance with one or more example embodiments of the present disclosure.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or a station 104 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 2, 3, 4A and 4B.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

Figure 6:
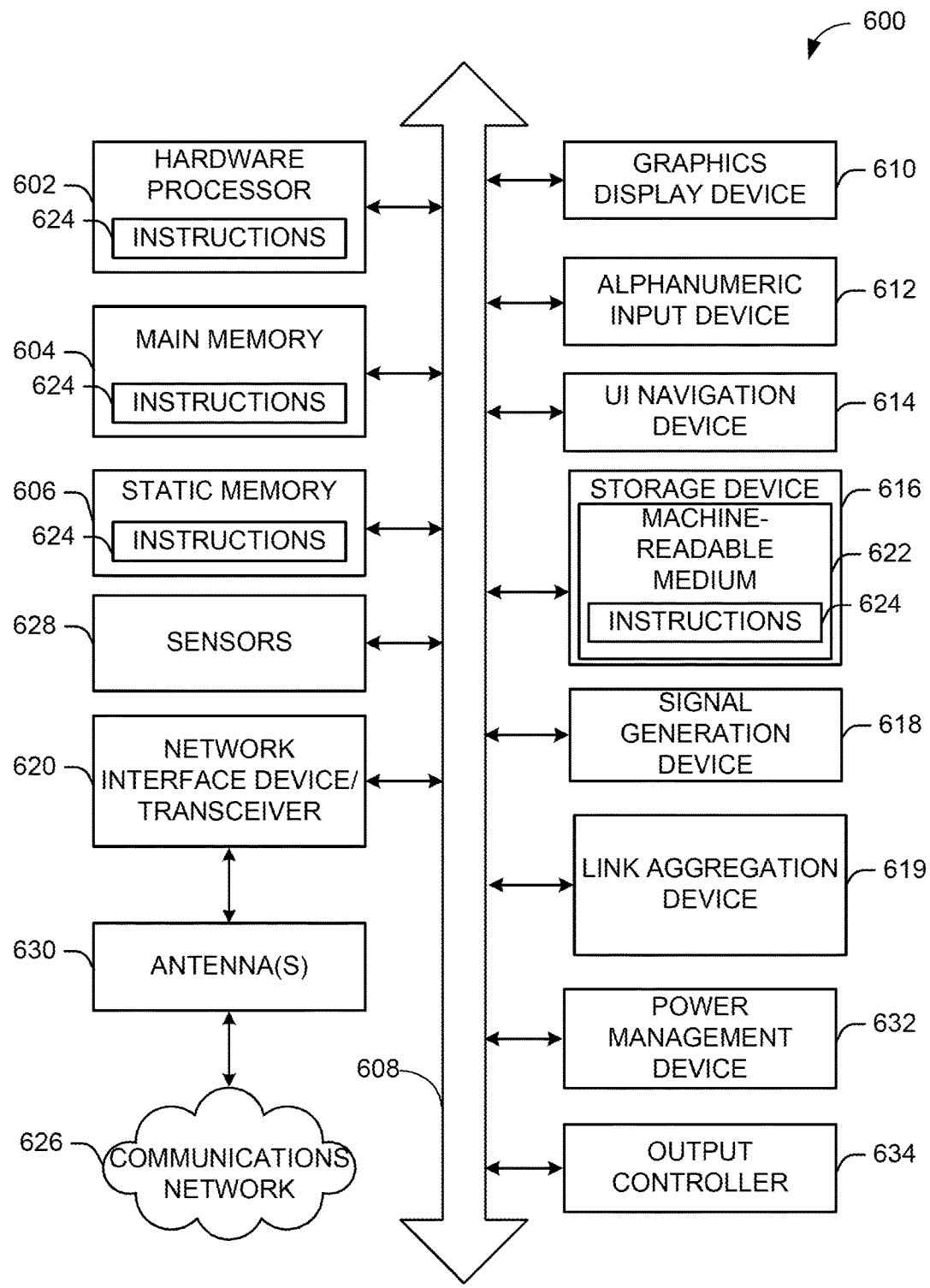
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating.

A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a link aggregation device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The link aggregation device 619 may carry out or perform any of the operations and processes (e.g., processes 400 and 450) described and shown above. For example, the link aggregation device 619 may define different states for a multiband link aggregation (MB-LA) setup protocol.

The MB-LA setup protocol defined by the link aggregation device 619 may include an initial state (e.g., State 1) when MB-LA is not established, a setup completion state (e.g., State 2) when MB-LA has been set up, an operating mode established state (e.g., State 3) when the MB-LA is implemented on a data plane, and an operating mode confirmed state (e.g., State 4) when the MB-LA is both implemented on the data plane and a successful data frame exchange between wireless devices has been confirmed.

The link aggregation device 619 may enable switching between the different states (e.g., States 1-4) including setup frame requests and setup frame responses used for establishing MB-LA between devices.

It is understood that the above are only a subset of what the link aggregation device 619 may be configured to perform and that other functions included throughout this disclosure may also be performed by the link aggregation device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a single input single output (SISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include memory and processing circuitry configured to determine a first frequency band and a second frequency band for sending data to a second device in a multiband link aggregation session. The memory and processing circuitry may be further configured to cause to send, in an initial state, a setup request frame to the second device for establishing the multiband link aggregation session. The memory and processing circuitry may be further configured to receive, in a setup completion state, a setup response frame from the second device to establish the multiband link aggregation session. The memory and processing circuitry may be further configured to cause to send, in an operating mode established state, the data to the second device over at least one of the first frequency band or the second frequency band in the multiband link aggregation session.

The implementations may include one or more of the following features. The memory and the processing circuitry may be further configured to receive, in an operating mode confirmed state, an acknowledgement frame from the second device for the multiband link aggregation session. The memory and the processing circuitry may be further configured to transition from operating mode established state to the operating mode confirmed state after receiving the acknowledgement frame from the second device. The memory and the processing circuitry may be further configured to transition from the initial state to the setup completion state after receiving the setup response frame from the second device. The memory and the processing circuitry may be further configured to transition from the operating mode confirmed state to the setup completion state after receiving the setup response frame from the second device. The memory and the processing circuitry may be further configured to cause to send a tear down frame in the operating mode confirmed state, the operating mode established state, or the setup completion state, to the second device for terminating the multiband link aggregation session. The memory and the processing circuitry may be further configured to cause to send a trigger frame to the second device. The trigger frame may include information associated with changing one or more characteristics of the multiband link aggregation session. The information may include instructions for performing one or more of: (i) changing a data stream policy, (ii) changing a channel power save status, (iii) changing the second device to a third device, (iv) changing the first frequency band to a third frequency band, or (v) changing a channel associated with the second device. The device may further include a transceiver configured to transmit and receive wireless signals. The device may further include one or more antennas coupled to the transceiver.

According to example embodiments of the disclosure, there may be a device. The device may include memory and processing circuitry configured to receive, in an initial state, a setup request frame from a first device for establishing a multiband link aggregation session. The memory and the processing circuitry may be further configured to cause to send, from a second device, in a setup completion state, a setup response frame to establish the multiband link aggregation session. The memory and the processing circuitry may be further configured to receive, from the second device, in an operating mode established state, data over at least one of a first frequency band and a second frequency band in the multiband link aggregation session. The first frequency band and the second frequency band may be determined by the first device.

The implementations may include one or more of the following features. The memory and the processing circuitry may be further configured to cause to send, in an operating mode confirmed state, an acknowledgement frame to the first device for the multiband link aggregation session. The memory and the processing circuitry may be further configured to transition from the operating mode established state to the operating mode confirmed state after causing to send the acknowledgment frame to the first device. The memory and the processing circuitry may be further configured to transition from the initial state to the setup completion state after causing to send the setup response frame from the second device. The memory and the processing circuitry may be further configured to receive a tear down frame to the first device for terminating the multiband link aggregation session. The memory and the processing circuitry may be further configured to receive a trigger frame from the first device. The trigger frame may include information associated with changing one or more characteristics of the multiband link aggregation session. The information may include instructions for performing one or more of: (i) changing a data stream policy, (ii) changing a channel power save status, (iii) changing the second device to a third device, (iv) changing the first frequency band to a third frequency band, or (v) changing a channel associated with the second device. The device may further include a transceiver configured to transmit and receive wireless signals. The device may further include one or more antennas coupled to the transceiver.

According to example embodiments of the disclosure, there may be a non-transitory computer-readable medium storing computer-executable instructions which, when executed by a processor, cause the processor to perform operations. The operations may include determining a first frequency band and a second frequency band for sending data to a device in a multiband link aggregation session. The operations may further include causing to send, in an initial state, a setup request frame to the device for establishing the multiband link aggregation session. The operations may further include receiving, in a setup completion state, a setup response frame from the device to establish the multiband link aggregation session. The operations may further include causing to send, in an operating mode established state, the data to the device over at least one of the first frequency band or the second frequency band in the multiband link aggregation session.

The implementations may include one or more of the following features. The operations may further include receiving, in an operating mode confirmed state, an acknowledgement frame from the device for the multiband link aggregation session. The operations may further include transitioning from the operating mode established state to the operating mode confirmed state after receiving the acknowledgement frame from the device. The operations may further include transitioning from the initial state to the setup completion state after receiving the setup response frame from the device. The operations may further include transitioning from the operating mode confirmed state to the setup completion state after receiving the setup response frame from the device. The operations may further include causing to send a tear down frame in the operating mode confirmed state, the operating mode established state, or the setup completion state, to the device for terminating the multiband link aggregation session. The operations may further include causing to send a trigger frame to the device. The trigger frame may include information associated with changing one or more characteristics of the multiband link aggregation session. The information may include instructions for performing one or more of: (i) changing a data stream policy, (ii) changing a channel power save status, (iii) changing a second device to a third device, (iv) changing the first frequency band to a third frequency band, or (v) changing a channel associated with the second device.

According to example embodiments of the disclosure, there may be a non-transitory computer-readable medium storing computer-executable instructions which, when executed by a processor, cause the processor to perform operations. The operations may include receiving, in an initial state, a setup request frame from a first device for establishing a multiband link aggregation session. The operations may further include causing to send, from a second device, in a setup completion state, a setup response frame to establish the multiband link aggregation session. The operations may further include receiving, from the second device, in an operating mode established state, data over at least one of a first frequency band and a second frequency band in the multiband link aggregation session. The first frequency band and the second frequency band may be determined by the first device.

The implementations may include one or more of the following features. The operations may further include causing to send, in an operating mode confirmed state, an acknowledgement frame to the first device for the multiband link aggregation session. The operations may further include transitioning from the operating mode established state to the operating mode confirmed state after causing to send the acknowledgment frame to the first device. The operations may further include transitioning from the initial state to the setup completion state after causing to send the setup response frame from the second device. The operations may further include receiving a tear down frame to the first device for terminating the multiband link aggregation session. The operations may further include receiving a trigger frame from the first device. The trigger frame may include information associated with changing one or more characteristics of the multiband link aggregation session. The information may include instructions for performing one or more of: (i) changing a data stream policy, (ii) changing a channel power save status, (iii) changing the second device to a third device, (iv) changing the first frequency band to a third frequency band, or (v) changing a channel associated with the second device.

According to example embodiments of the disclosure, there may include a method. The method may include determining, by one or more processors, a first frequency band and a second frequency band for sending data from a first device to a second device in a multiband link aggregation session. The method may further include causing to send, in an initial state, a setup request frame from the first device to the second device for establishing the multiband link aggregation session. The method may further include receiving at the first device, in a setup completion state, a setup response frame from the second device to establish the multiband link aggregation session. The method may further include causing to send from the first device, in an operating mode established state, the data to the second device over at least one of the first frequency band and the second frequency band in the multiband link aggregation session.

The implementations may include one or more of the following features. The method may further include receiving, in an operating mode confirmed state, an acknowledgement frame from the second device for the multiband link aggregation session. The method may further include sending a tear down frame in the operating mode confirmed state, the operating mode established state, or the setup completion state, to the second device for terminating the multiband link aggregation session.

According to example embodiments of the disclosure, there may include a method. The method may include receiving, in an initial state, a setup request frame from a first device for establishing a multiband link aggregation session. The method may further include causing to send, from a second device, in a setup completion state, a setup response frame to establish the multiband link aggregation session. The method may further include receiving, from the second device, in an operating mode established state, data over at least one of a first frequency band and a second frequency band in the multiband link aggregation session. The first frequency band and the second frequency band may be determined by the first device.

The implementations may include one or more of the following features. The method may further include causing to send, in an operating mode confirmed state, an acknowledgement frame to the first device for the multiband link aggregation session. The method may further include transitioning from the operating mode established state to the operating mode confirmed state after causing to send the acknowledgment frame to the first device. The method may further include transitioning from the initial state to the setup completion state after causing to send the setup response frame from the second device. The method may further include receiving a tear down frame to the first device for terminating the multiband link aggregation session. The method may further include receiving a trigger frame from the first device. The trigger frame may include information associated with changing one or more characteristics of the multiband link aggregation session. The information may include instructions for performing one or more of: (i) changing a data stream policy, (ii) changing a channel power save status, (iii) changing the second device to a third device, (iv) changing the first frequency band to a third frequency band, or (v) changing a channel associated with the second device.

In example embodiments of the disclosure, there may be an apparatus. The apparatus may include means for determining a first frequency band and a second frequency band for sending data from a first device to a second device in a multiband link aggregation session. The apparatus may include means for causing to send, in an initial state, a setup request frame from the first device to the second device for establishing the multiband link aggregation session. The apparatus may include means for receiving at the first device, in a setup completion state, a setup response frame from the second device to establish the multiband link aggregation session. The apparatus may include means for causing to send from the first device, in an operating mode established state, the data to the second device over at least one of the first frequency band and the second frequency band in the multiband link aggregation session.

The implementations may include one or more of the following features. The apparatus may include means for receiving, in an operating mode confirmed state, an acknowledgement frame from the second device for the multiband link aggregation session. The apparatus may include means for sending a tear down frame in the operating mode confirmed state, the operating mode established state, or the setup completion state, to the second device for terminating the multiband link aggregation session.

In example embodiments of the disclosure, there may be an apparatus. The apparatus may include means for receiving, in an initial state, a setup request frame from a first device for establishing a multiband link aggregation session. The apparatus may include means for causing to send, from a second device, in a setup completion state, a setup response frame to establish the multiband link aggregation session. The apparatus may include means for receiving, from the second device, in an operating mode established state, data over at least one of a first frequency band and a second frequency band in the multiband link aggregation session. The first frequency band and the second frequency band may be determined by the first device.

The implementations may include one or more of the following features. The apparatus may include means for causing to send, in an operating mode confirmed state, an acknowledgement frame to the first device for the multiband link aggregation session. The apparatus may include means for transitioning from the operating mode established state to the operating mode confirmed state after causing to send the acknowledgment frame to the first device. The apparatus may include means for transitioning from the initial state to the setup completion state after causing to send the setup response frame from the second device. The apparatus may include means for receiving a tear down frame to the first device for terminating the multiband link aggregation session. The apparatus may include means for receiving a trigger frame from the first device. The trigger frame may include information associated with changing one or more characteristics of the multiband link aggregation session. The information may include instructions for performing one or more of: (i) changing a data stream policy, (ii) changing a channel power save status, (iii) changing the second device to a third device, (iv) changing the first frequency band to a third frequency band, or (v) changing a channel associated with the second device.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry configured to:
   determine a first frequency band and a second frequency band for sending data to a second device in a multiband link aggregation session;
   cause to send, in an initial state, a setup request frame to the second device for establishing the multiband link aggregation session, the setup request frame comprising an indication of the first frequency band and the second frequency band;
   identify, in a setup completion state, a setup response frame received from the second device, the setup response frame establishing the multiband link aggregation session; and
   cause to send, in an operating mode established state, the data to the second device over at least one of the first frequency band or the second frequency band in the multiband link aggregation session.

2. The device of claim 1, wherein the memory and the processing circuitry are further configured to receive, in an operating mode confirmed state, an acknowledgement frame from the second device for the multiband link aggregation session.

3. The device of claim 2, wherein the memory and the processing circuitry are further configured to transition from operating mode established state to the operating mode confirmed state after receiving the acknowledgement frame from the second device.

4. The device of claim 1, wherein the memory and the processing circuitry are further configured to transition from the initial state to the setup completion state after receiving the setup response frame from the second device.

5. The device of claim 1, wherein the memory and the processing circuitry are further configured to transition from the operating mode confirmed state to the setup completion state after receiving the setup response frame from the second device.

6. The device of claim 1, wherein the memory and the processing circuitry are further configured to cause to send a tear down frame in the operating mode confirmed state, the operating mode established state, or the setup completion state, to the second device for terminating the multiband link aggregation session.

7. The device of claim 1, wherein the memory and the processing circuitry are further configured to cause to send a trigger frame to the second device, the trigger frame comprising information associated with changing one or more characteristics of the multiband link aggregation session.

8. The device of claim 7, wherein the information comprises instructions for performing one or more of: (i) changing a data stream policy, (ii) changing a channel power save status, (iii) changing the second device to a third device, (iv) changing the first frequency band to a third frequency band, or (v) changing a channel associated with the second device.

9. The device of claim 1, further comprising a transceiver configured to transmit and receive wireless signals.

10. The device of claim 9, further comprising one or more antennas coupled to the transceiver.

11. A non-transitory computer-readable medium storing computer-executable instructions which when executed by one or more processors result in performing operations comprising:
　identifying, in an initial state, a setup request frame received from a first device, the setup request frame comprising an indication of a first frequency band and a second frequency band associated with a multiband link aggregation session;
　causing to send, from a second device, in a setup completion state, a setup response frame, the setup response frame establishing the multiband link aggregation session;
　identifying, in an operating mode established state, data received from the second device over at least one of the first frequency band and the second frequency band, wherein the at least one of the first frequency band and the second frequency band are determined by the first device.

12. The non-transitory computer-readable medium of claim 10, the operations further comprising causing to send, in an operating mode confirmed state, an acknowledgement frame to the first device for the multiband link aggregation session.

13. The non-transitory computer-readable medium of claim 12, the operations further comprising transitioning from the operating mode established state to the operating mode confirmed state after causing to send the acknowledgment frame to the first device.

14. The non-transitory computer-readable medium of claim 10, the operations further comprising transitioning from the initial state to the setup completion state after causing to send the setup response frame from the second device.

15. The non-transitory computer-readable medium of claim 10, the operations further comprising receiving a tear down frame to the first device for terminating the multiband link aggregation session.

16. The non-transitory computer-readable medium of claim 10, the operations further comprising receiving a trigger frame from the first device, the trigger frame comprising information associated with changing one or more characteristics of the multiband link aggregation session.

17. The non-transitory computer-readable medium of claim 16, wherein the information comprises instructions for performing one or more of: (i) changing a data stream policy, (ii) changing a channel power save status, (iii) changing the second device to a third device, (iv) changing the first frequency band to a third frequency band, or (v) changing a channel associated with the second device.

18. A method comprising:
　determining, by one or more processors of a first device, a first frequency band and a second frequency band for sending data to a second device in a multiband link aggregation session;
　causing to send, by the one or more processors, in an initial state, a setup request frame to the second device, the setup request frame comprising an indication of a first frequency band and a second frequency band associated with the multiband link aggregation session;
　identifying, by the one or more processors, in a setup completion state, a setup response frame received from the second device, the setup response frame establishing the multiband link aggregation session; and
　causing to send, by the one or more processors, in an operating mode established state, the data to the second device over at least one of the first frequency band and the second frequency band in the multiband link aggregation session.

19. The method of claim 18, further comprising receiving, in an operating mode confirmed state, an acknowledgement frame from the second device for the multiband link aggregation session.

20. The method of claim 18, further comprising sending a tear down frame in the operating mode confirmed state, the operating mode established state, or the setup completion state, to the second device for terminating the multiband link aggregation session.

* * * * *